US008804850B1

(12) United States Patent
Khan et al.

(10) Patent No.: US 8,804,850 B1
(45) Date of Patent: *Aug. 12, 2014

(54) SYSTEM AND METHOD TO EXECUTE A CLIPPING INSTRUCTION

(71) Applicant: Marvell International Ltd., Hamilton (BM)

(72) Inventors: Moinul H. Khan, San Diego, CA (US); Bradley C. Aldrich, Austin, TX (US)

(73) Assignee: Marvell International, Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,856

(22) Filed: May 6, 2013

Related U.S. Application Data

(63) Continuation of application No. 12/273,160, filed on Nov. 18, 2008, now Pat. No. 8,437,410.

(60) Provisional application No. 60/989,678, filed on Nov. 21, 2007.

(51) Int. Cl.
*H04N 7/12* (2006.01)

(52) U.S. Cl.
USPC .................................................. 375/240.29

(58) Field of Classification Search
USPC ...................................... 382/233; 375/240.29
See application file for complete search history.

(56) References Cited

U.S. PATENT DOCUMENTS

| 5,801,977 | A | 9/1998 | Karp et al. |
| 5,953,457 | A * | 9/1999 | Tucker et al. ................. 382/233 |
| 6,642,962 | B1 | 11/2003 | Lin et al. |
| 7,020,873 | B2 | 3/2006 | Bik et al. |
| 7,283,588 | B2 | 10/2007 | Bjontegaard |
| 7,725,691 | B2 | 5/2010 | Stein et al. |
| 2004/0021591 | A1 | 2/2004 | Maruya et al. |
| 2007/0074007 | A1 | 3/2007 | Topham et al. |
| 2007/0097254 | A1 | 5/2007 | Battles et al. |

* cited by examiner

*Primary Examiner* — Mark Rinehart
*Assistant Examiner* — Gbemileke Onamuti

(57) ABSTRACT

Devices, systems, methods, and other embodiments associated with clipping instructions are described. In one embodiment, an apparatus includes a receive logic to receive the clipping instruction. The clipping instruction includes a pixel value to be clipped and a clipping boundary. The apparatus also includes an execution logic to execute the clipping instruction in one clock cycle. The clipping instruction clips pixels by comparing a magnitude of the pixel value identified in the clipping instruction to a magnitude of the clipping boundary identified in the clipping instruction. When the magnitude of the pixel value exceeds the magnitude of the clipping boundary, the pixel is selectively clipped to a result value.

20 Claims, 9 Drawing Sheets

US 8,804,850 B1

SYSTEM AND METHOD TO EXECUTE A CLIPPING INSTRUCTION

CROSS REFERENCE TO RELATED APPLICATIONS

This disclosure is a continuation of U.S. application Ser. No. 12/273,160 filed on Nov. 18, 2008, now U.S. Pat. No. 8,437,410 which claims benefit under 35 USC §119(e) to U.S. provisional application Ser. No. 60/989,678 filed on Nov. 21, 2007, which are both hereby wholly incorporated by reference.

BACKGROUND

Applications such as video conferencing, video telephony, and other applications that transmit images will process video data. Video data includes pixel data. A pixel is the smallest discrete component of an image or picture. A pixel is usually a colored dot. Because of the large amount of video data needed to represent an image, hardware and software resources of a device processing the video data may become overwhelmed and the video quality may suffer.

Video data compression and decompression standards have been developed to reduce the size of video data that needs to be processed. This facilitates improving the processing of video data. Some video compression standards, such as the H.264 standard, process video data through a de-blocking filtering operation. The de-blocking filtering operation executes a clipping operation to clip video data values to boundary values. The boundary values may change because the boundary values are dependent on other operations executed to perform the H.264 compression standard. In prior systems, to execute some clipping operations with boundaries that may change, up to ten wireless MMX® (WMMX) instructions were needed. A more efficient way of processing clipping operations may be desired.

SUMMARY

In general, one aspect of this specification discloses an apparatus for executing clipping instructions. The apparatus includes a receive logic to receive the clipping instruction. The clipping instruction includes a pixel value to be clipped and clipping boundary. The apparatus also includes an execution logic to execute the clipping instruction in one clock cycle. The clipping instruction clips pixels by comparing a magnitude of the pixel value identified in the clipping instruction to a magnitude of the clipping boundary identified in the clipping instruction. When the magnitude of the pixel value exceeds the magnitude of the clipping boundary, the pixel is selectively clipped to a result value.

In general, another aspect of this specification discloses a method for executing clipping instructions. The method includes receiving a clipping instruction for clipping pixels in a video image. The clipping instruction has a pixel value to be clipped and a clipping boundary. The pixel value and the clipping boundary identified by the clipping instruction are retrieved. A magnitude of the pixel value is compared to a magnitude of the clipping boundary. The pixel value is selectively clipped to a result value upon determining that the pixel value magnitude exceeds the clipping boundary magnitude.

In general, another aspect of this specification discloses a method for executing clipping instructions. The method includes a receive logic to receive a clipping instruction. The clipping instruction has a pixel value to be clipped and a clipping boundary. The magnitudes of the pixel value and the clipping boundary are determined. The pixel value is selectively clipped to the clipping boundary upon determining that the pixel magnitude exceeds the clipping magnitude.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
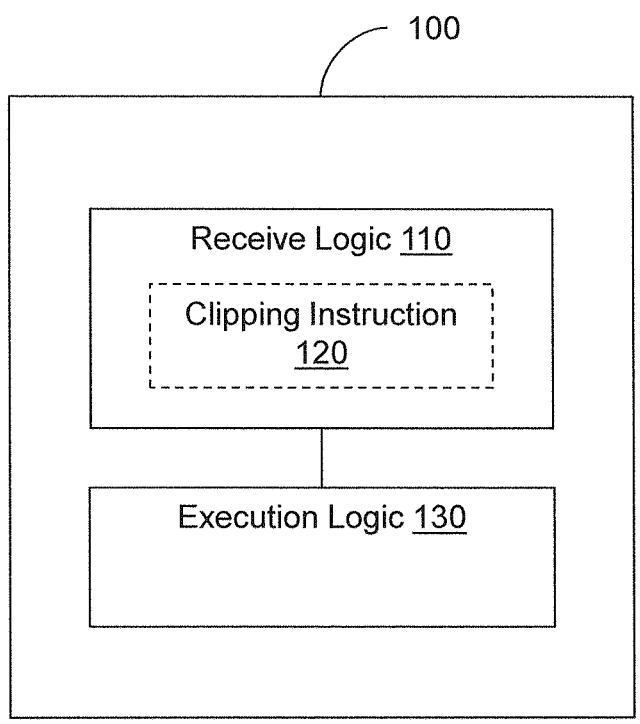
FIG. 1 illustrates one embodiment of an apparatus associated with clipping instructions.

Described herein are example systems, methods and other embodiments associated with clipping instructions. In one embodiment, an apparatus includes a receive logic to receive a clipping instruction. The clipping instruction may clip filtered values in a video image de-blocking operation. The clipping instruction contains references to a video data value and a clipping value. As discussed below, the clipping instruction instructs the apparatus to clip the video data value to the clipping value. For example, if the clipping value is the value "C", then a bi-directional clipping instruction clips the video data value to the range (−C, +C). In another example of a clipping instruction, a unidirectional clipping instruction clips the video data value to the range (0, +C).

The clipping instruction may be a single instruction multiple data (SIMD) clipping instruction with multiple pointers to multiple video data values. For example, the SIMD clipping instruction may have pointers to four video data values and four clipping values. Executing this single SIMD clipping instruction will perform four clipping operations with a single instruction The apparatus also includes an execution logic. The execution logic executes the clipping instruction. The clipping instruction is executed by retrieving the video data value referenced by the clipping instruction and retrieving the clipping value referenced by the clipping instruction. The execution logic calculates a video data magnitude of the video data value. The execution logic also calculates a clipping magnitude of the clipping value. The execution logic determines if the video data magnitude exceeds the clipping magnitude. If the pixel magnitude exceeds the clipping magnitude, the video data value is selectively clipped.

Executing a single clipping instruction pointing to a video data value and a clipping value reduces the number of instructions needed to process a clipping operation. For example, consider the ten wireless MMX (WMMX) instructions needed to implement a unidirectional clipping operation:

| | | |
|---|---|---|
| WABS | wR2, wR0; | the video data value is in wR0 |
| WABS | wR3, wR1; | the clipping value is in wR1 |
| WCOMPMLT | wR4, wR2, wR3; | |
| WAND | wR5, wR0, wR4 | |
| WANDN | wR6, wR3, wR4 | |
| WOR | wR8, wR6, wR5 | |
| WCOMPMLT | wR7, wR0, wR15 | |
| WCOMPMLT | wR9, wR1, wR15 | |
| WMULH | wR7, wR8, wR7 | |
| WMULH | wR7, wR8, wR7; | a clipped result is in wR7 |

These ten WMMX instructions may be replaced with a single clipping instruction. In one embodiment, the clipping instruction may be executed in one clock cycle. In another embodiment, the clipping instruction is executed in a single pass through a microprocessor pipeline.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a programmable logic device, a CD, other optical medium, a RAM, a ROM, a memory chip or card, a memory stick, and other media from which a computer, a processor or other electronic device can read.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

FIG. 1 illustrates one embodiment of an apparatus 100 associated with clipping instructions. The apparatus 100 includes a receive logic 110. The receive logic 110 receives a clipping instruction 120. The clipping instruction 120, when executed, clips filtered values in a video image de-blocking operation.

The apparatus 100 also includes an execution logic 130. The execution logic 130 executes the clipping instruction 120. In one example, when executed, the clipping instruction 120 is executed in one clock cycle.

The execution logic 130 executes the clipping instruction 120 by retrieving a pixel value. A pixel is the smallest discrete component of an image or picture. A pixel is usually a colored dot. A pixel value is a numerical color value of a pixel. The pixel value may be pointed to by the clipping instruction 120. The execution logic 130 retrieves a clipping value that may be pointed to by the clipping instruction 120. In another embodiment, rather than dereferencing a pointer, the pixel value and/or the clipping value may be contained in a field of the clipping instruction 120. In another embodiment, the clipping instruction may retrieve the pixel and clipping values from a register specified by the clipping instruction. Those of ordinary skill in the art will recognize other ways for the clipping instruction to indicate the pixel value and the clipping value.

The execution logic 130 calculates a pixel magnitude of the pixel value. The pixel magnitude is a positive numerical value of the magnitude of the pixel value. The execution logic 130 calculates a clipping magnitude of the clipping value. The clipping magnitude is a positive numerical value of the magnitude of the clipping value.

The execution logic 130 determines whether the pixel magnitude exceeds the clipping magnitude. If the pixel magnitude exceeds the clipping magnitude, then the pixel value is selectively clipped by the execution logic 130 to a result value. If the pixel magnitude does not exceed the clipping magnitude, then the pixel value is not clipped by the execution logic 130. The execution logic 130 may return the result value to a location specified by the clipping instruction 120.

In one embodiment, the apparatus 100 may be software configurable. For example, software may configure the apparatus 100 to establish the result value as an eight bit value or a sixteen bit value. These result value sizes are only examples. Other result value sizes may be established by the apparatus 100. In one embodiment, the receive logic 110 receives clipping instructions 120 having different sized pixel values. Thus, the execution logic 130 may execute clipping instructions 120 having different sized pixel values.

In one embodiment, the apparatus 100 may be implemented in a chip. A chip is a set of micro-miniaturized electronic circuits fabricated on a semiconductor material. In another embodiment, the apparatus 100 is operably connected to a processor in a chip. In some embodiments, the apparatus 100 may be an integrated circuit. In other embodiments, the apparatus 100 is implemented a hard disk drive, a digital versatile disc player, a high definition television, a vehicle, a cellular phone, a set top box, a media player, or a Voice over Internet Protocol (VoIP) phone. For example, the apparatus 100 may be implemented in a high definition television to facilitate the decompression digital video images.

Figure 2:
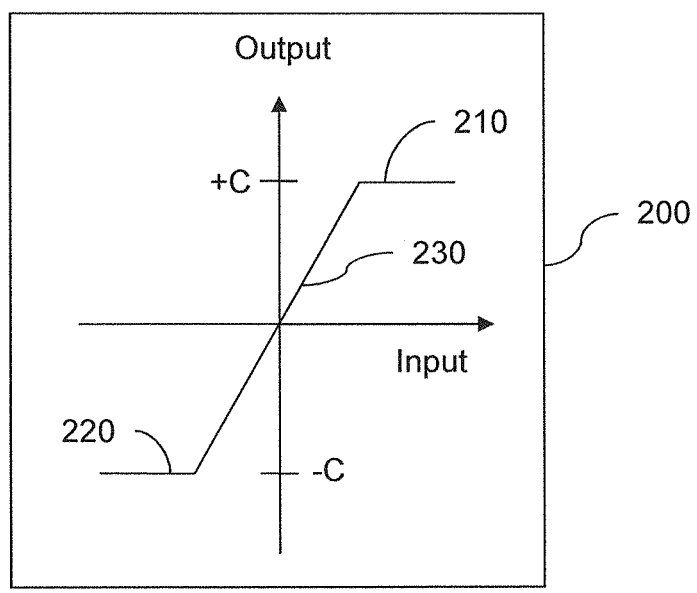
FIG. 2 illustrates one embodiment of a clipping operation.

FIG. 2 illustrates one embodiment of a clipping operation 200. The clipping operation 200 may be represented by the clipping instruction 120 of FIG. 1 and may be implemented by the apparatus 100 of FIG. 1. The clipping operation 200 clips positive input values that are above a positive clipping value +C. The positive input values may be clipped to the clipping value +C. The clipping operation 200 clips negative input values that are below a negative clipping value −C. The negative input values may be clipped to the clipping to the value −C. The positive input values and the negative input values may be pixel values.

Clipped positive input values that exceed the positive clipping value +C are represented by line segment 210. In one embodiment, the clipping operation 200 selectively clips pixel values to a result value. A determination is made to determine whether the pixel value is positive. If the pixel value is positive, comparison is made to determine whether the pixel value exceeds the clipping value +C. If the pixel value is positive and exceeds the clipping value +C, the result value is established as the clipping value.

Clipped negative input values that exceed the negative clipping value −C are represented by line segment 220. In one embodiment, a pixel value is selectively clipped to a result value. A determination is made to determine if a pixel value is negative. When the pixel value is negative, the result value is established as a negative magnitude of the clipping value.

Input values that are between the positive clipping value +C and the negative clipping value −C are not clipped and are unchanged by the clipping operation 200. Input values that are not clipped are shown as line segment 230.

The clipping operation of FIG. 2 may be implemented by a clipping instruction represented by:

CLIP1 vR0, vR1, vR2

CLIP1 is the instruction mnemonic. The symbol vR1 is the value that may be clipped or is a pointer to the value that may be clipped. The symbol vR2 represents the positive clipping boundary +C and the negative clipping boundary −C. VR1 will be clipped when the value of vR1 is outside a clipping boundary of (−vR2, +vR2). The result value will be stored in a location pointed to by symbol vR0. Of course, the order of the symbols can be changed. In another embodiment, the apparatus of FIG. 100 executes the clipping instruction CLIP1 in one clock cycle.

Figure 3:
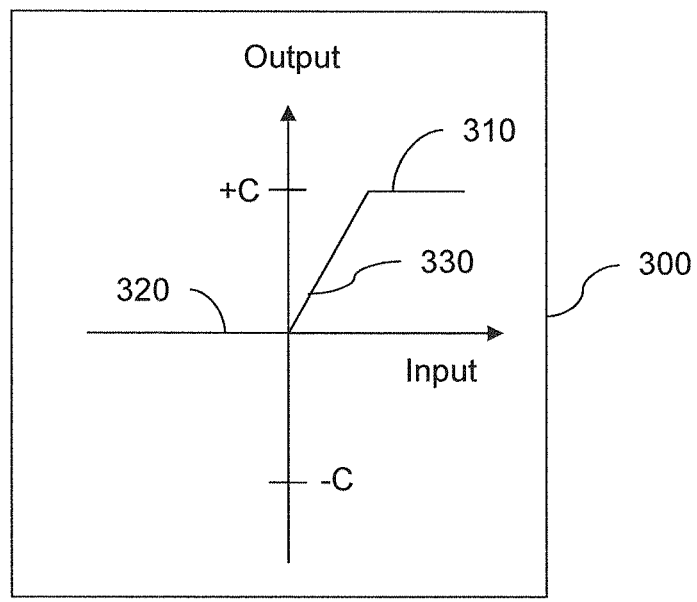
FIG. 3 illustrates another embodiment of a clipping operation.

FIG. 3 illustrates one embodiment of another clipping operation 300. The clipping operation 300 may be represented by the clipping instruction 120 of FIG. 1 and may be implemented by the apparatus 100 of FIG. 1. Positive input values are clipped as discussed above with reference to FIG. 2. In FIG. 3, clipped positive input values that exceed the positive clipping value +C are represented by line segment 310.

Negative input values are clipped to zero. Clipped negative input values are represented by line segment 320. Input values that are between the positive clipping value +C and zero are not clipped and are unchanged by the clipping operation 300. Input values that are not clipped are shown as line segment 330. In one embodiment, a pixel value is selectively clipped to a result value. A determination is made to determine if a pixel value is negative. When the pixel value is negative, the result value is established as a zero value.

The clipping operation of FIG. 3 may be implemented by a clipping instruction represented by:

CLIP2 vR0, vR1, vR2

CLIP2 is the instruction mnemonic. The symbol vR1 is the value that may be clipped or is a pointer to the value that may be clipped. The symbol vR2 represents the positive clipping boundary +C. VR1 will be clipped when the value of vR1 is outside a clipping boundary of (0, +vR2). The result value will be stored in a location pointed to by symbol vR0. Of course, the order of the symbols can be changed. In one embodiment, the apparatus 100 of FIG. 1 executes the clipping instruction CLIP2 in one clock cycle. Those of ordinary skill in the art will recognize that different clipping instructions and different forms of clipping instructions may be implemented.

Figure 4:
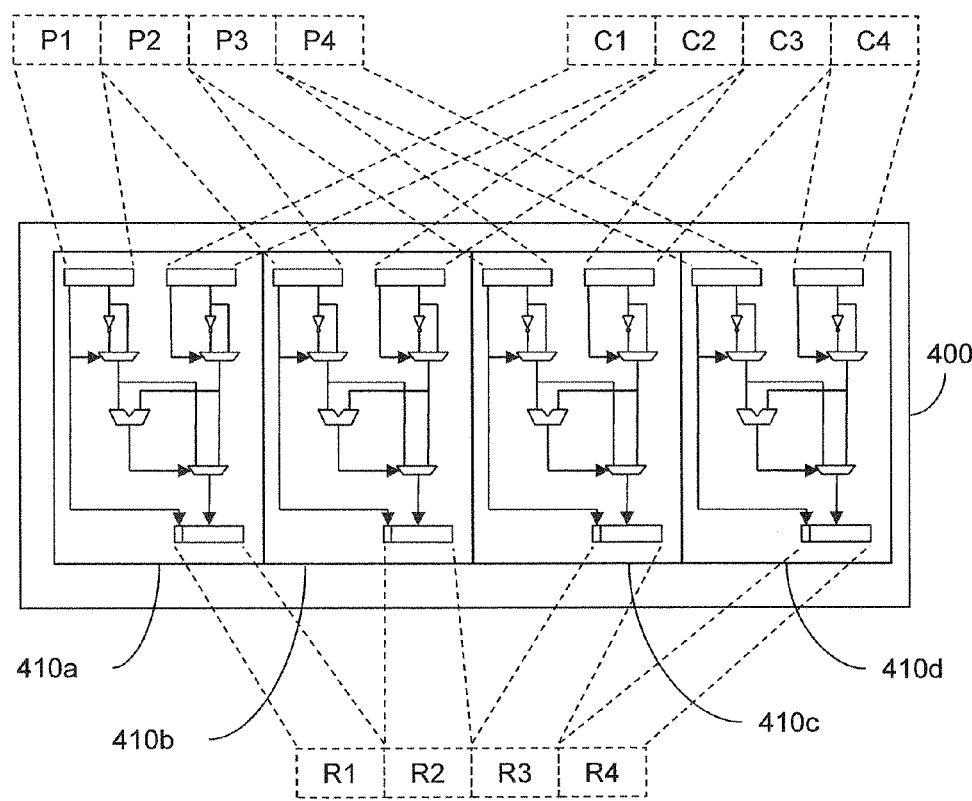
FIG. 4 illustrates another embodiment of an apparatus associated with clipping instructions.

FIG. 4 illustrates an embodiment of an apparatus 400 that executes a a single instruction multiple data (SIMD) clipping instruction. The apparatus 400 may execute a SIMD clipping instruction that points to four pixel values P1-4. The SIMD clipping instruction may also point to four clipping values C1-4 corresponding to the pixel values P1-4. The SIMD clipping instruction may also point to four result value locations R1-4.

The apparatus 400 will receive the SIMD clipping instruction. The apparatus 400 will retrieve the pixel values P1-4 and clipping values C1-4. In one embodiment, the apparatus 400 contains four execution units 410a-d. The apparatus 400 will provide execution units 410a-d with one of the pixel values P1-4 and a corresponding clipping value C1-4. Execution units 410a-d will execute the clipping operation as discussed above. Execution units 410a-d will provide result values. The apparatus 400 will store the result values to the result value locations R1-4.

Figure 5:
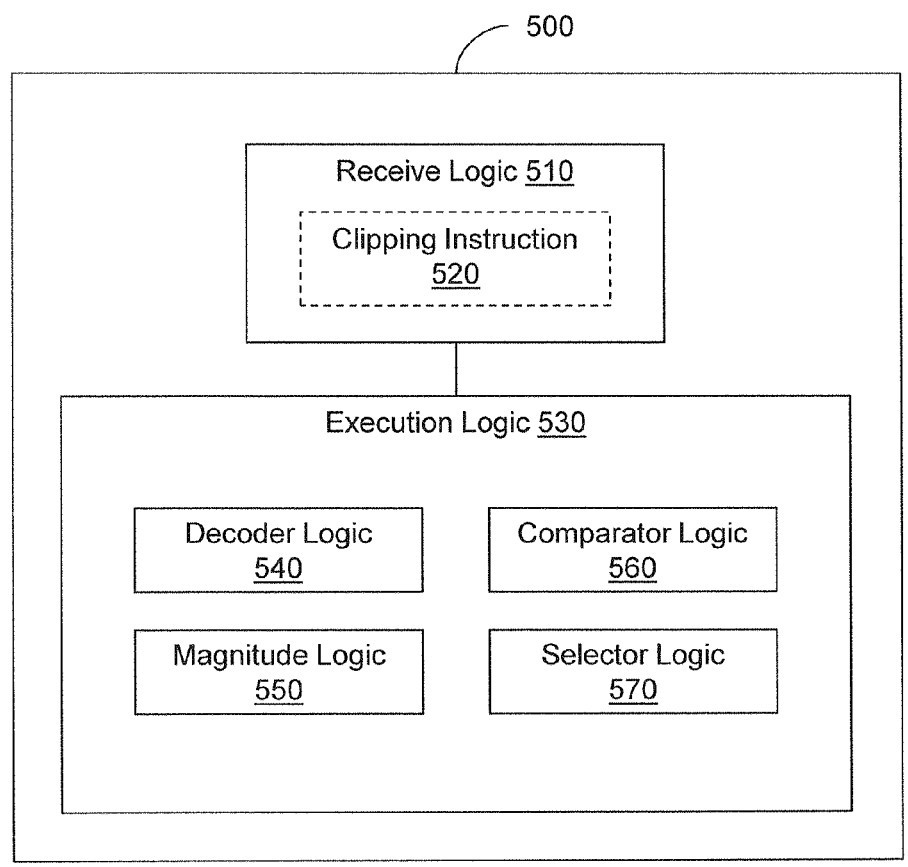
FIG. 5 illustrates another embodiment of an apparatus associated with clipping instructions.

FIG. 5 illustrates another embodiment of an apparatus 500 that executes clipping instructions. The apparatus 500 includes a receive logic 510. The receive logic 510 receives a clipping instruction 520. When executed the clipping instruction 520 clips filtered values in a video image de-blocking operation.

The apparatus 500 includes an execution logic 530. The execution logic 530 executes the clipping instruction 520 in one clock cycle. The execution logic 530 includes a decoder logic 540, a magnitude logic 550, a comparator logic 560, and a selector logic 570.

The decoder logic 540 decodes the clipping instruction 520. The decoder logic 540 retrieves a pixel value pointed to by the clipping instruction 520. The pixel value includes pixel bits and a pixel sign bit. The decoder logic 540 also retrieves a clipping value pointed to by the clipping instruction 520. The clipping value includes magnitude bits and a magnitude sign bit. In other embodiments, the decoder logic 540 retrieves the pixel value and/or the clipping value from the clipping instruction 520.

In one embodiment, pixel values are represented with a pixel sign bit and a pixel magnitude value. The sign bit indicates if the pixel magnitude value is positive or negative. The pixel magnitude value may be encoded in a gray scale or another suitable format. The magnitude logic 550 inverts the pixel bits to generate inverted pixel bits. Based on the pixel sign bit, the magnitude logic 550 also establishes pixel magnitude bits by selecting the pixel bits or the inverted pixel bits. In one embodiment the magnitude logic 550 will generate inverted pixel bits using inverters to invert the pixel bits. The pixel magnitude bits are established by a multiplexer selecting the pixel bits or the inverted pixel bits.

The magnitude logic 550 also inverts the magnitude bits to generate inverted magnitude bits. Based on the magnitude sign bit, the magnitude logic 550 establishes clipping magnitude bits by selecting the magnitude bits or the inverted magnitude bits. In one embodiment, the inverted pixel bits and the inverted magnitude bits are generated so that a comparison, as discussed below, may be performed on two positive values. For example, if the magnitude bits and the pixel bits both represent a negative value then the inverted magnitude bits and the inverted pixel bits will be selected for the comparison operation.

The comparator logic 560 compares a value of the pixel magnitude bits to a value of the clipping magnitude bits. In one embodiment, the comparator logic 560 may be logic that determines whether the value of the pixel magnitude bits is greater than the value of the clipping magnitude bits. The comparison produces a comparison signal.

The selector logic 570 establishes a result value based on the comparison signal. The result value is established as the pixel magnitude bits or the clipping magnitude bits based on the result value. The selector logic 570 also generates a result sign bit by selecting the pixel sign bit. In one embodiment, the selector logic 570 establishes the result value as the clipping magnitude bits when the comparison signal indicates that the value of clipping magnitude bits is greater than the value of the magnitude bits.

Figure 6:
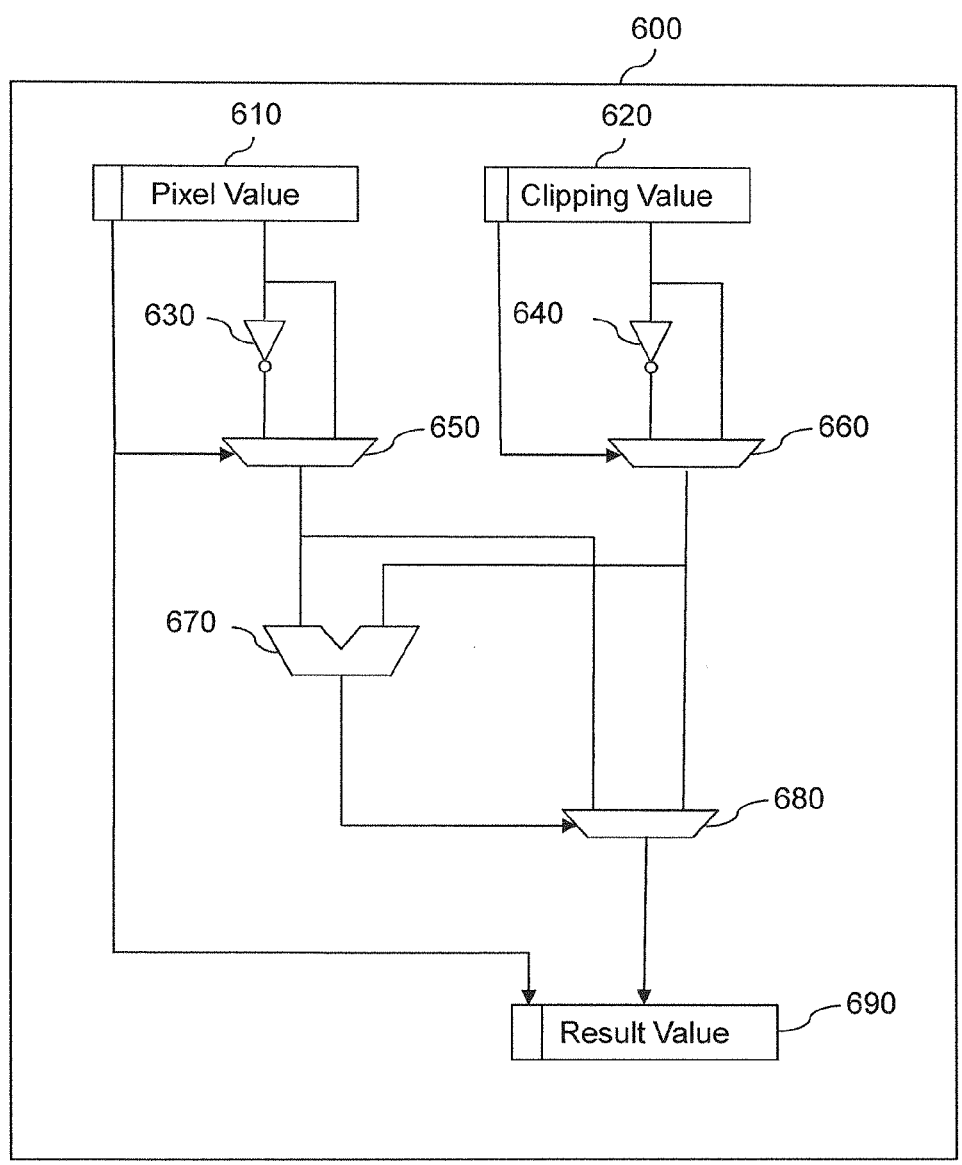
FIG. 6 illustrates another embodiment of an apparatus associated with clipping instructions.

FIG. 6 illustrates another embodiment of an apparatus 600 that executes clipping instructions. The apparatus 600 decodes a clipping instruction and retrieves pixel bits, a pixel sign bit, clipping bits, and a clipping sign bit. The pixel bits and the pixel sign bit may be stored in a pixel storage location 610. The clipping bits and clipping sign bit may be stored in a clipping storage location 620. The pixel storage location 610 and the clipping storage location 620 may be, for example, registers or flip-flops.

The pixel bits are inverted with a pixel inverter 630 to generate inverted pixel bits. A clipping inverter 640 inverts the clipping bits to generate inverted clipping bits. In FIG. 6, single devices are shown operating on values that may include more than one bit forming the value. For example, one pixel inverter 630 is shown inverting the pixel bits. It is to be understood that the logic implementing the apparatus 600 may actually include more than one pixel inverter 630 for inverting the pixel bits. In one embodiment, the number of pixel inverters 630 may equal the number of pixel bits that are inverted.

A pixel magnitude multiplexer 650 generates pixel magnitude bits. The pixel bits and the inverted pixel bits are input to the pixel magnitude multiplexer 650. A pixel value sign bit controls whether the pixel magnitude multiplexer 650 selects the pixel bits or the inverted pixel bits as a pixel magnitude bits.

Similar to the pixel magnitude multiplexer 650, a clipping magnitude multiplexer 660 generates clipping magnitude bits. The magnitude bits and the inverted magnitude bits are input to the clipping magnitude multiplexer 660. A magnitude sign bit controls whether the clipping magnitude multiplexer 660 selects the magnitude bits or the inverted magnitude bits as a clipping magnitude bits.

The pixel magnitude bits and the clipping magnitude bits are input to a comparator logic 670. The comparator logic 670 determines whether a value of the pixel magnitude bits is greater than a value of the clipping magnitude bits. The compare result is output as a comparison signal.

In one embodiment, a select multiplexer 680 establishes a result value. The selector multiplexer 680 has a first input and a second input. The pixel magnitude bits are connected to the first input and the clipping magnitude bits are connected to the second input. The select multiplexer 680 includes a select input. The comparison signal from the comparator logic 670 is input into the select input. The select input controls the select multiplexer 680 to select a selected input. The selected input the first input or the second input. In one embodiment, the apparatus 600 controls the selected input to be established as the result value.

The apparatus 600 also generates a result sign bit by selecting the pixel sign bit. The result value and the result sign bit may be stored in a result storage location 690. The result storage location 690 may be, for example, a register or a set of flip-flops.

Figure 7:
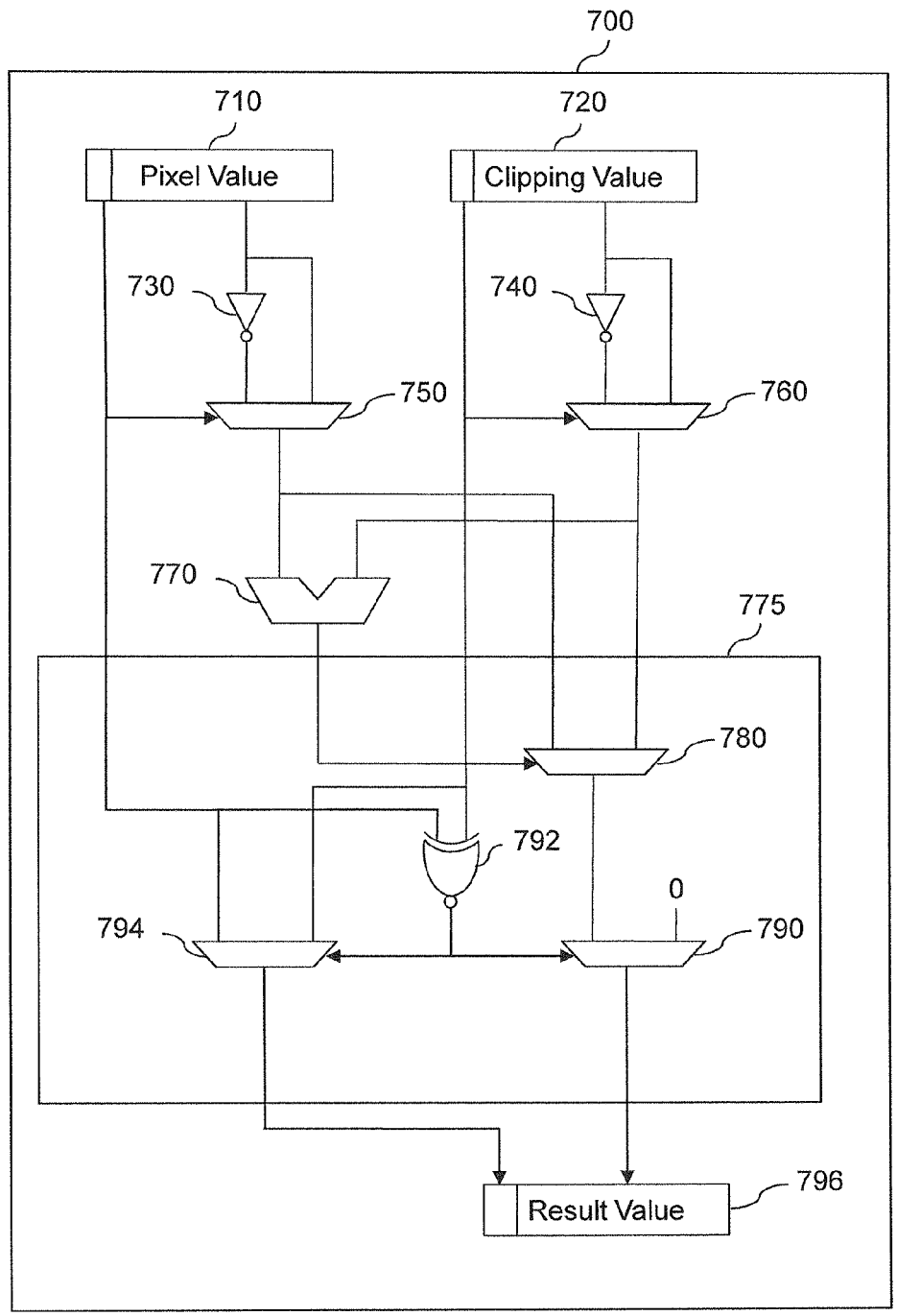
FIG. 7 illustrates another embodiment of an apparatus associated with clipping instructions.

FIG. 7 illustrates another embodiment of an apparatus 700 that executes clipping instructions. Similar to the apparatus 600 of FIG. 6, the apparatus 700 decodes a clipping instruction and retrieves pixel bits, a pixel sign bit, clipping bits, and a clipping sign bit. A pixel storage location 710, a clipping storage location 720, a pixel inverter 730, a clipping inverter 740, a pixel magnitude multiplexer 750, and a clipping magnitude multiplexer 760 generate pixel magnitude bits and clipping magnitude bits similar to corresponding components in FIG. 6. Like the apparatus of FIG. 6, a comparator logic 770 establishes a comparison signal. The comparison signal is based on whether a value of the pixel magnitude bits is greater than a value of the clipping magnitude bits.

Using the schematic drawing style of FIG. 6, single devices in FIG. 7 are shown operating on values that may include more than one bit forming the value. For example, one pixel inverter 730 is shown inverting the pixel bits. It is to be understood that the logic implementing the apparatus 700 may include more than one pixel inverter 730 for inverting more than one pixel bit. The number of pixel inverters 730 may equal the number of pixel bits that are inverted.

In one embodiment, the apparatus includes a selector logic 775. Based on the comparison signal, the selector logic 775 establishes a result value by selecting either the pixel magnitude bits, the clipping magnitude bits, or a zero value. Based on the pixel sign bit and the magnitude sign bit, the selector logic 775 also generates a result sign.

In another embodiment, the result value is generated by establishing the result value as a value of the pixel magnitude bits. The comparison signal may signal that the result value will be established as the pixel magnitude bits. This may indicate that the value of the clipping magnitude bits is greater than the value of the pixel magnitude bits and that the pixel sign bit is the same sign as the magnitude sign bit.

In some embodiments, the selector logic 775 includes a select multiplexer 780 to generate a first multiplexer output. The select multiplexer 780 includes a first input, a second input, and a select input. The pixel magnitude bits are input to the first input, the clipping magnitude bits are input to the second input, and the comparison signal is input to the select input. The select input controls the first input to be switched to the first multiplexer output when the comparison signal indicates that the value of the pixel magnitude bits is less than the value of the clipping magnitude bits.

The selector logic 775 includes a decision multiplexer 790. The decision multiplexer 790 includes a first decision input, a second decision input, and a decision multiplexer output. The first multiplexer output is input to the first decision input, and the zero value is input to the second decision input. The selector logic 775 controls the decision multiplexer output to be established as the result value. In one embodiment, the decision multiplexer 790 clips negative pixel values to the zero value.

In some embodiments, the decision multiplexer 790 includes a decision select input. The decision select input controls whether the first decision input or the second decision input is output to the decision multiplexer output. The first decision input is output to the decision multiplexer output when the decision select input is a high value.

In another embodiment, the selector logic 775 includes an exclusive NOR gate 792. The exclusive NOR gate 792 has a first gate input, a second gate input, and a gate output. The pixel sign bit is input to the first gate input and the magnitude sign bit is input to the second gate input. The gate output is input to the decision select input of the decision multiplexer.

In one embodiment, the gate output is connected to a select input of a sign multiplexer 794 that establishes the result sign. The sign multiplexer 794 has a first sign input, a second sign input, and a sign output. The pixel sign bit is input to the first sign input and the clipping sign bit is input the second sign input. The sign output is the result sign. The result value and the result sign may be stored in a result storage location 796. The result storage location 796 may be, for example, a register or a set of flip-flops.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 8:
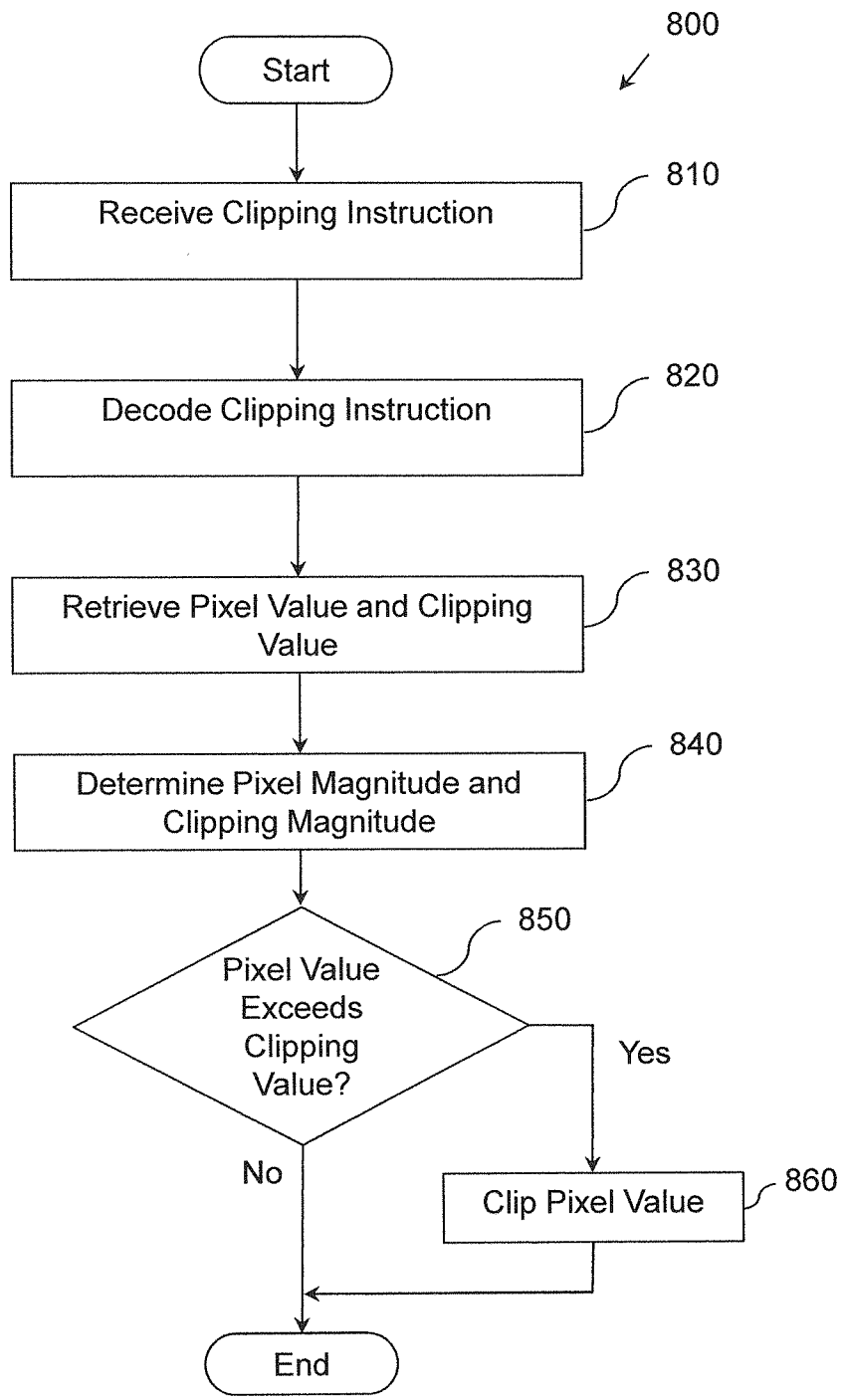
FIG. 8 illustrates one embodiment of a method associated with clipping instructions.

FIG. 8 illustrates an example method 800 to execute a clipping instruction. The method 800 includes, at 810, receiving a clipping instruction. In one embodiment, the clipping instruction clips filtered values in a video image de-blocking operation. In one embodiment, the clipping instruction references a pixel value and a clipping value. In another embodiment, the pixel value and the clipping value may be in the clipping instruction. The clipping instruction clips the pixel value to the clipping value when a magnitude of the pixel value is greater than a magnitude of the clipping value.

The method 800 also includes, at 820, decoding the clipping instruction. Decoding may include determining what kind of clipping operation is to be performed as indicated by an operation field in the clipping instruction. For example, if the clipping instruction is a CLIP1 instruction as discussed above, then a pixel value is clipped to the range (−C, +C). If the clipping instruction is a CLIP2 instruction as discussed above then the pixel value is clipped to the range (0, +C). Other clipping instructions and other clipping ranges may be implemented by the method 800.

The method 800 includes, at 830, retrieving the pixel value and the clipping value. The pixel value and the clipping value may be retrieved by dereferencing pointer values in the clipping instruction. In other embodiments, the pixel value and the clipping value may be retrieved directly from the clipping instruction.

At 840, a pixel magnitude of the pixel value is determined. A clipping magnitude of the clipping value is also determined, at 840. The pixel magnitude and the clipping magnitude may be determined by inverting bits of the pixel value and the clipping value, as discussed above, for example.

The method 800 includes, at 850, determining if the pixel magnitude exceeds the clipping magnitude. If the pixel magnitude exceeds the clipping magnitude, then the pixel value is selectively clipped, at 860.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 9:
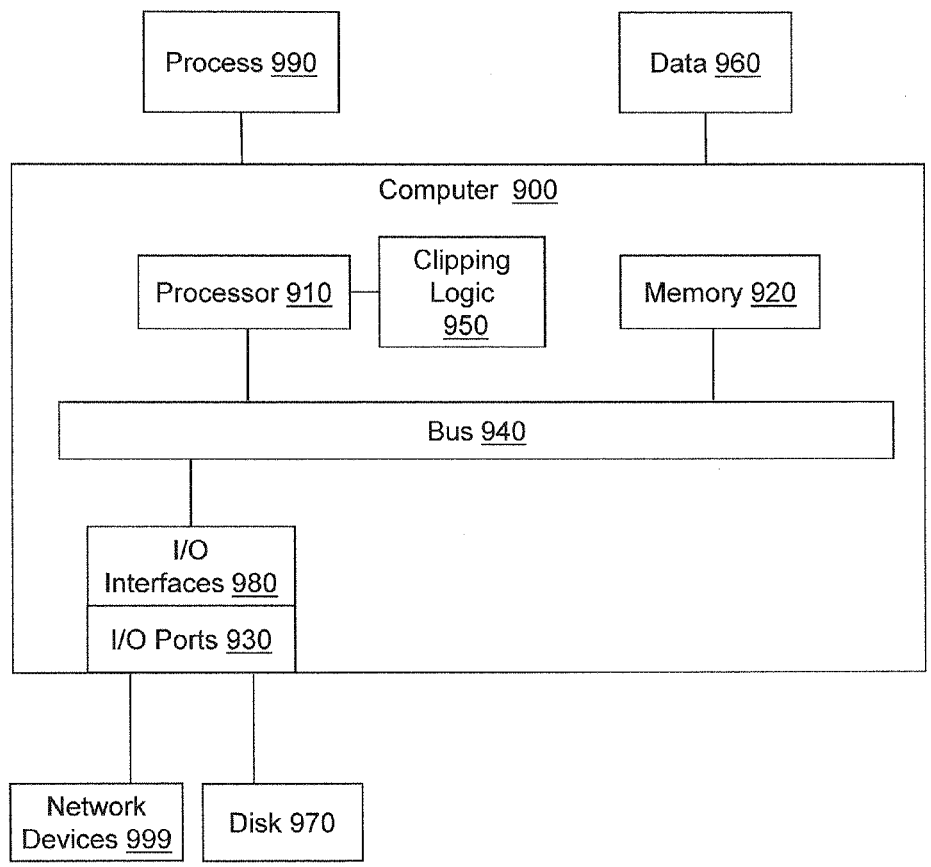
FIG. 9 illustrates one embodiment of a computing environment in which example systems and methods, and equivalents associated with clipping instructions may be implemented.

FIG. 9 illustrates an example computing device in which example systems and methods described herein, and equivalents, may be implemented. The example computing device may be a computer 900 that includes a processor 910, a memory 920, and input/output ports 930 operably connected by a bus 940. In one example, the computer 900 may include a clipping logic 950 to execute clipping instructions.

The clipping logic 950 provides a means (e.g., hardware, stored software, firmware) for receiving a clipping instruction and executing the clipping instruction. The clipping logic 950 can be implemented similar to the apparatus 100, 500, 600 or 700, and/or combinations of their features.

The clipping logic 950 can include logic implemented, for example, as an ASIC or other type of circuit.

Generally describing an example configuration of the computer 900, the processor 910 may be a variety of various processors including dual microprocessor and other multi-processor architectures. A memory 920 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 970 may be operably connected to the computer 900 via, for example, through an input/output interface (e.g., card, device) 980 and the input/output port 930. The disk 970 may be, for example, a magnetic disk drive, a solid state disk drive, a floppy disk drive, a tape drive, a Zip drive, a flash memory card, a memory stick, and so on. Furthermore, the disk 970 may be a compact disk read-only memory (CD-ROM) drive, a compact disk recordable (CD-R) drive, a compact disk rewritable (CD-RW) drive, a digital video disk read-only memory (DVD ROM), and so on. The memory 920 can store a process 990 and/or a data 960, for example. The disk 970 and/or the memory 920 can store an operating system that controls and allocates resources of the computer 900.

The bus 940 may be a single internal bus interconnect architecture and/or other bus or mesh architectures. While a single bus is illustrated, it is to be appreciated that the computer 900 may communicate with various devices, logics, and peripherals using other busses (e.g., peripheral component interconnect express (PCIE), 1394, universal serial bus (USB), Ethernet). The bus 940 can be types including, for example, a memory bus, a memory controller, a peripheral bus, an external bus, a crossbar switch, and/or a local bus.

The computer 900 may interact with input/output devices via the input/output (I/O) interfaces 980 including the clipping logic 950 and the input/output ports 930. Input/output devices may be, for example, a keyboard, a microphone, a pointing and selection device, cameras, video cards, displays, the disk 970, the network devices 999, and so on. The input/output ports 930 may include, for example, serial ports, parallel ports, and USB ports.

The computer 900 can operate in a network environment and thus may be connected to the network devices 999 via the I/O interfaces 980, and/or the I/O ports 930. Through the network devices 999, the computer 900 may interact with a network. Through the network, the computer 900 may be logically connected to remote computers. Networks with which the computer 900 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. An apparatus, comprising:
    a receive logic configured to receive a clipping instruction, the clipping instruction identifying a pixel having a pixel value to be clipped, an upper clipping boundary, and a lower clipping boundary, where a range between the upper clipping boundary and the lower clipping boundary specifies a range of acceptable pixel values; and
    an execution logic configured to execute the clipping instruction, where the clipping instruction is configured to cause the execution logic to clip pixels by:
        comparing the pixel value to at least one of the upper clipping boundary or the lower clipping boundary; and
        when the pixel value is outside the range between the upper clipping boundary and the lower clipping boundary, selectively clipping the pixel value to a result value that corresponds to either the upper clipping boundary or the lower clipping boundary.

2. The apparatus of claim 1, where the execution logic is configured to selectively clip the pixel value to zero upon determining that the pixel value is negative.

3. The apparatus of claim 1, where the execution logic is configured to selectively clip the pixel value to the upper clipping boundary upon determining that the pixel value is positive.

4. The apparatus of claim 1, where the execution logic is configured to selectively clip the pixel value to the lower clipping boundary upon determining the pixel value is negative.

5. The apparatus of claim 1, where the clipping instruction identifies a plurality of respective pixels and respective clipping boundaries, and further where the execution logic comprises a plurality of parallel execution units that each clip one of the plurality of pixels in the one clock cycle.

6. The apparatus of claim 1, where the pixel value and the clipping boundary are stored in memory locations pointed to by the clipping instruction.

7. The apparatus of claim 1, where the execution logic is configured to execute clipping instruction as part of a video image de-blocking operation.

8. The apparatus of claim 1, where the execution logic is configured to return the result value to a location identified by the clipping instruction.

9. A method, comprising:
    receiving a clipping instruction for clipping pixels in a video image, the clipping instruction identifying a pixel having a pixel value to be clipped, an upper clipping boundary, and a lower clipping boundary, where a range between the upper clipping boundary and the lower clipping boundary specifies a range of acceptable pixel values;
    comparing the pixel value to at least one of the upper clipping boundary or the lower clipping boundary; and
    selectively clipping the pixel value to a result value that corresponds to either the upper clipping boundary or the lower clipping boundary upon determining that the pixel value is outside the range between the upper clipping boundary and the lower clipping boundary.

10. The method of claim 9, where the method is carried out in one clock cycle.

11. The method of claim 9, where the method is carried out in a single pass through a microprocessor pipeline.

12. The method of claim 9, where the clipping instruction identifies a plurality of respective pixels and respective upper and lower clipping boundaries.

13. The method of claim 12, further comprising clipping the plurality of pixels in a single clock cycle.

14. The method of claim 9, further comprising storing the pixel value and at least one of upper and lower the clipping boundary in memory locations pointed to by the clipping instruction.

15. The method of claim 9, where the clipping instructions are executed as part of a video image de-blocking operation.

16. The method of claim 9, where the result value is returned to a location identified by the clipping instruction.

17. A method, comprising:
    with one or more logics:
        receiving a clipping instruction for clipping pixels, the clipping instruction identifying a pixel having a pixel value to be clipped, an upper clipping boundary, and a lower clipping boundary, where a range between the upper clipping boundary and the lower clipping boundary that specifies a range of acceptable pixel values;
        determining a pixel magnitude of the pixel value;
        determining a clipping magnitude of at least one of the upper clipping boundary and the lower clipping boundary;
        comparing the pixel magnitude to the magnitude of the clipping boundary; and
        selectively clipping the pixel value to the magnitude of the clipping boundary upon determining that the pixel magnitude exceeds the clipping magnitude.

18. The method of claim 17, where the method is carried out in one clock cycle.

19. The method of claim 17, where the method is carried out in a single pass through a microprocessor pipeline.

20. The method of claim 17, where the pixel value is clipped as a part of a video image de-blocking operation.

* * * * *